United States Patent [19]

Straub

[11] 4,308,971
[45] Jan. 5, 1982

[54] PRESSURE VESSEL AND A METHOD OF PRODUCING SAME

[75] Inventor: Hermann Straub, Winterthur, Switzerland

[73] Assignee: Sulzer Brothers Limited, Winterthur, Switzerland

[21] Appl. No.: 968,867

[22] Filed: Dec. 12, 1978

[30] Foreign Application Priority Data

Dec. 20, 1977 [CH] Switzerland .................. 15716/77

[51] Int. Cl.³ .......................................... B65D 45/16
[52] U.S. Cl. ..................................... 220/315; 220/3
[58] Field of Search ................. 220/3, 315, 346, 351, 220/319, 320; 215/201

[56] References Cited

U.S. PATENT DOCUMENTS

| 3,219,228 | 11/1965 | Sørensen | 220/315 |
| 3,672,403 | 6/1972 | Wilson et al. | 220/315 X |
| 3,895,735 | 7/1975 | Clay | 220/315 X |
| 4,009,798 | 3/1977 | Pechacek | 220/315 X |

Primary Examiner—Steven M. Pollard
Attorney, Agent, or Firm—Kenyon & Kenyon

[57] ABSTRACT

The large diameter pressure vessel is constructed without flanges and has resiliently deformable ring elements welded to the respective ends of a hollow member and a cap. These ring elements are locked together by various types of locking means. In one embodiment, a ball type closure is used while in other embodiments hasps are utilized.

13 Claims, 7 Drawing Figures

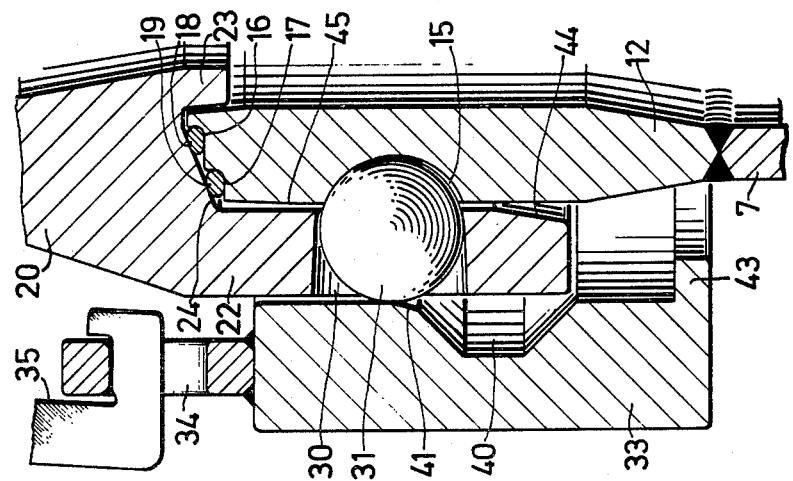
FIG. 2
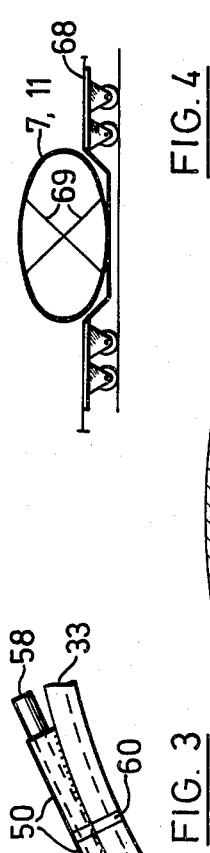
FIG. 3
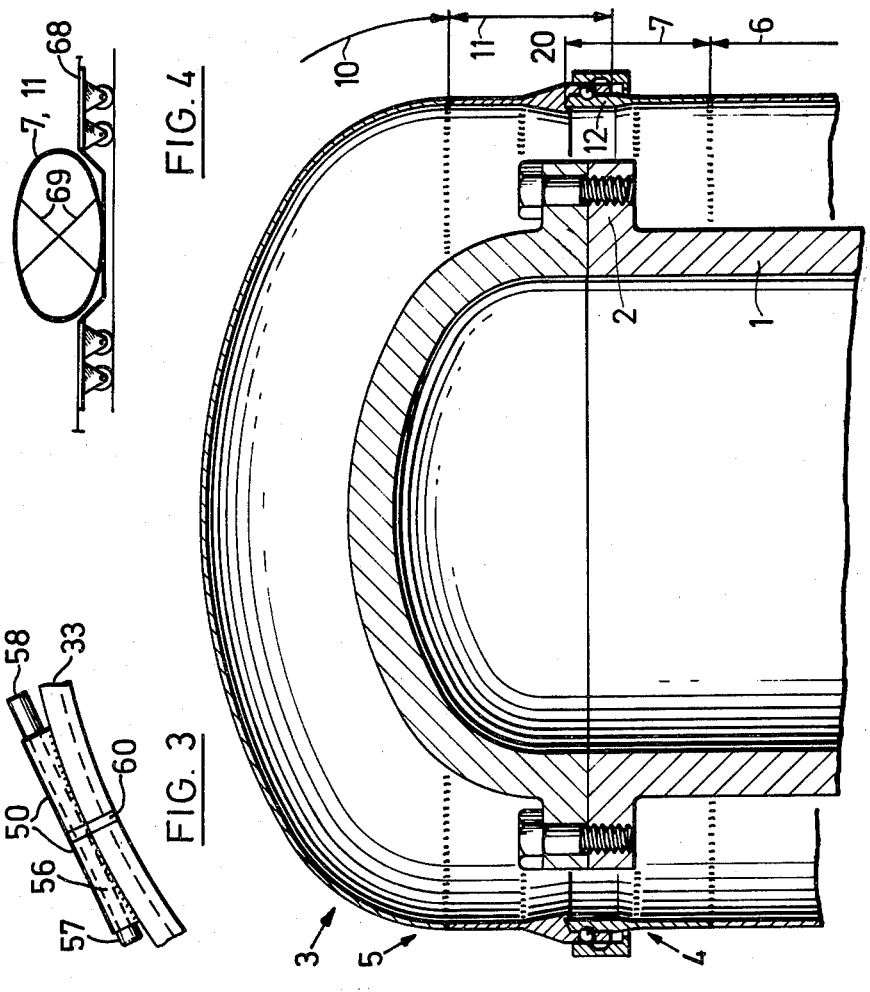
FIG. 4
FIG. 1

PRESSURE VESSEL AND A METHOD OF PRODUCING SAME

This invention relates to a pressure vessel and to a method of producing a pressure vessel.

As is known, because of the sizes involved, large diameter pressure vessels have usually been subdivided into separate vessel parts and covers. In particular, the cover of such a pressure vessel is usually connected by way of a conventional flanged connection to the vessel part, which can be arranged on a vertical or horizontal axis. A flanged connection of this kind has a relatively large overhang since bores must be provided in the flange to receive closure bolts. The diameter is therefore further increased.

One problem with large pressure vessels which exceed rail and road loading gauges is that they have to be welded together on the site where they are to be erected. A further problem is that the flanges, which are prefabricated together with the other parts of the vessel in a shop (works) before being welded together, also exceed rail and road loading gauges. Therefore, the flanges have to await arrival at the erection site before they can be welded to the vessel parts and machined. This factor greatly complicates assembly of the vessel.

Accordingly, it is an object of the invention to provide a method of production and constructional steps which enable the connecting and closing elements of a large diameter pressure vessel to be works-processed and which enable these prefabricated items to be transported even though they are out-of-gauge loads.

It is another object of the invention to provide a relatively simple technique for shipping oversized ring elements for pressure vessels.

It is another object of the invention to provide a relatively simple means of effecting a closure between a pressure vessel part and a cover.

Briefly, the invention provides a method of producing a large diameter pressure vessel as well as a pressure vessel of large diameter.

The method includes a step of providing a hollow member with a cylindrical end of predetermined diameter and a cap with a cylindrical end of a diameter equal to the diameter of the hollow member. The hollow member and cap can be prefabricated in a shop and shipped to an erection site or can be formed of prefabricated discrete elements which are separably shipped and welded together at the erection site. In addition, each one of a pair of prefabricated peripherally continuous ring elements are disposed in facing relation to a respective end of the hollow member and cap at the erection site and welded thereto to form a vessel part and cap. The ring elements are prefabricated in the shop and are adapted to be radially resiliently deformable by means of bracing elements for shipment.

The method also includes a step of locking the ring elements which are welded to the hollow member and cap coaxially to each other. In this regard, the ring elements are disposed in overlapping relation within a horizontal interface zone between the vessel part and cover and are locked together by suitable closure or locking members.

The pressure vessel comprises a hollow member having a cylindrical end of predetermined outer diameter, a cap having a cylindrical end of an outer diameter equal to that of the hollow member, a first ring element welded to the end of the hollow member to form a vessel part, a second ring element welded to the end of the cap to form a cover in overlapping relation with the first ring element and means for locking the overlapped ring elements together.

The locking means includes an annular groove in one ring element, a plurality of locking members mounted in the other ring element for movement into and out of the groove and a clamping ring about the outer ring element for moving the locking members into the groove.

The omission of conventional flanges in the vessel reduces overhang and obviates the great rigidity of "transverse" material surfaces. Also, the ring elements which are welded to the cover and the vessel part remain very thin in relation to diameter and can therefore be resiliently deformed without overstressing before they are welded together with the other parts of the vessel to form an ellipse whose minor axis lies within rail and road loading gauges. Another advantage is that the operations of opening and closing the vessel take very little time.

In one embodiment of the pressure vessel which allows rapid closure and opening thereof, the cover and the vessel part bear on one another by means of a known ball locking or closure means wherein balls are movable in radial apertures and are pressed into grooves in the inside ring element by a conical surface of a clamping ring.

In another embodiment in which opening of a long-closed vessel can sometimes be facilitated since the locking or catch elements are unlocked automatically, the locking elements are rotatably mounted in the outer ring element and engage by way of a hasp in the inner ring element and by way of a lever which projects outwardly beyond the outer ring element in a recess in the clamping ring. The clamping ring in this case is movable in the direction of the vessel axis. In this embodiment, the vessel can also be closed sealingly by having the outside ring element clamped to the inside ring element by means of the locking or catch elements if the bearing surface in the outer ring element and the hasp bearing surfaces engaging in the groove in the inner ring element are each in the form of a partial toroidal surface; and the centers of the radii of curvature, being disposed in radial cross-sections of the tori, for the bearing surfaces are so disposed that an outwards and inwards pivoting, respectively, of the hasps relative to the inner ring element opens or closes a gap.

It is a simple matter to obviate and to compensate for minor hyperelastic distortions which occur during transportation and which may possibly lead to warping of the vessel part relative to the cover or vice versa after welding of the ring elements upon closure of the vessel. To this end, the ring elements are made thicker than the walls of the vessel part and of the cover and/or the outer ring, which is conveniently disposed on the cover, engages internally around the inner ring element.

In the case of vertical-axis vessels having an interface in a horizontal plane between the vessel part and the cover, the clamping ring for a ball catch or closure is used by virtue of its weight to press the balls into the grooves in the inner ring element. For this purpose, it is structurally convenient for the clamping ring to have a recess to receive the balls in the unlocked position as well as an upwardly directed conveying conical clamping surface within the recess for moving the balls into the locking position in the groove of the inner ring element. Finally, to facilitate opening and closure of the vessels, the clamping ring has means for the connection of lifting tackle and/or has a shoulder at a lower end for abutting a bottom edge of the outer ring element with the clamping ring in a raised position.

These and other objects and advantages of the invention will become more apparent from the following detailed description and appended claims taken in conjunction with the accompanying drawings in which:

FIG. 1 illustrates a vertical sectional view through a pressure vessel in accordance with the invention which extends as a shell or envelope around a high-pressure boiler;

FIG. 2 illustrates a view to an enlarged scale of a ball catch or lock, as a detail of the pressure vessel of FIG. 1;

FIG. 3 illustrates a side view showing part of a fastener or the like for clamping a clamping ring together;

FIG. 4 illustrates a diagrammatic view showing transportation of a resiliently deformed annular ring element for a pressure vessel constructed in accordance with the invention;

Figure 5:
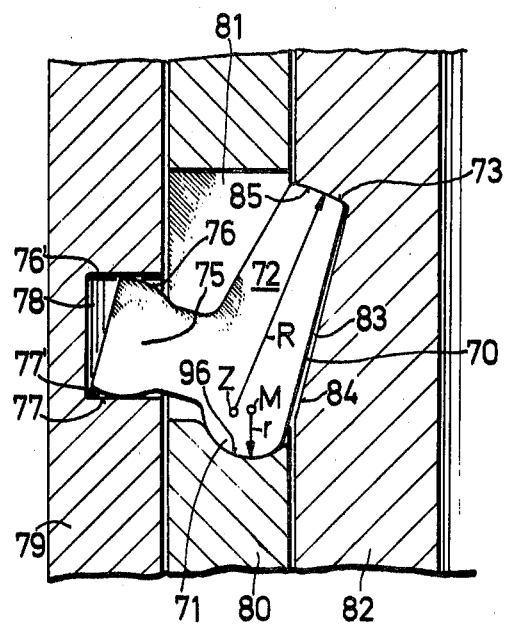
FIG. 5 illustrates a cross-sectional view of a modified locking means in accordance with the invention.

Referring to FIG. 1, a high-pressure boiler 1 having a conventional flange connection 2 is encased within a large diameter pressure vessel 3 comprising a vessel part 4 and a cover 5; the vessel part 4 is in the form of a beaker-like hollow member 6 which is open at the top end and assembled on site by welding to a thin ring element 7 free of radial flanges. Similarly, the cover 5 is in the form of a cap 10 which is welded together on site to a works-fabricated thin ring element 11 free of radial flanges.

As indicated in FIG. 1, the top end of the hollow member 6 is cylindrical and has a predetermined outer diameter while the lower end of the cap 10 is also cylindrical and of the same outer diameter. The ring elements 7, 11 have the same outer diameter adjacent to the member 6 and cap 10.

Referring to FIGS. 1 and 2, both ring elements 7, 11 are radially resiliently deformable for purposes as explained below. In addition, the ring element 7 of the vessel part 4 has a thickened edge 12 which has been welded to the body 7a of the ring element 7 to form that prefabricated element and is formed on the outside with a groove 15 as well as two steps 16, 17 on the end face of the edge 12. Each step 16, 17 receives a respective resilient ring seal 18, 19. The ring element 11 of the cover 5 terminates in a thickened edge 20 which has been welded to the body 11a of the ring element 11 to form that prefabricated element and is formed at the free end with a downwardly prolonged arm 22 on the outside and a short arm 23 on the inside. The arms 22, 23 are separated from one another by a slightly conical recess 24.

With the vessel assembled, the recess 24 receives the top part of the edge 12 of the vessel part 4. The arm 23 and the top part of the edge 12 have conical surfaces which are adjacent one another and which are disposed opposite one another either with a reduced clearance or in contact with one another.

The two overlapped ring elements 7, 11 are locked together by a locking means of the ball-closure type. As shown in FIG. 2, the locking means includes the groove 15 in the inner ring element 7, a large number, e.g. one hundred, of radially disposed apertures or bores 30 which are peripherally distributed in the arm 22 of the outer ring element 11, a plurality of balls 31, each of which is disposed in a respective aperture 30, and a clamping ring 33 about the outer ring element 11.

The axis of each bore 30 extends in a plane perpendicular to the vessel axis. The bores 30 are treated so as to be slightly conical from the outside, their smallest diameter being less than the diameter of the ball 31 provided in each bore 30.

The clamping ring 33 extends around the two thickened edges 12, 20 and has means at the top in the form of loops or lugs or the like 34 adapted to be engaged by hooks 35 of a lifting tackle (not shown). The ring 33 is formed with a trapezoidal-section annular recess 40 which has an upwardly directed conveying clamping surface 41 at the top. The ring 33 also has a shoulder 43 at the lower end whose inside diameter is smaller than the outside diameter of the arm 22. In this manner, the shoulder 43 is sized to abut the bottom edge of the outer ring element 11 in a raised position of the ring 33 relative to the ring element 11.

As shown in FIG. 3, the ring 33 can be separated by a radial cut at one or more places and have clamp tubes 50 through which a screwthreaded pin 56 having a head 57 extends tangentially of the ring 33. The pin 56 can be tightened by a longitudinal nut 58 formed with an internal hexagon. Interchangeable shims 60 of different thicknesses can be provided in the gap between the parts of the ring 33.

Referring to FIG. 4, the ring elements or edge zones 7, 11 can be shipped on a well wagon 68. To this end, cross-bracing elements 69 are used to produce such a resilient deformation of the elements 7, 11 that the elements 7, 11 are deformed into the shape of ellipses so that their minor axes do not exceed the railway loading gauge. Advantageously, as seen from the front, the elliptically distorted elements 7, 11 are disposed in a diagonal of the railway loading gauge.

In order to assemble the vessel, the parts for the hollow member 6 and the cap 10 are delivered to the erection site where they are welded together. The ring element 7 and the ring element 11 are works prefabricated and delivered to the erection site in the resiliently braced or secured state. On the site, the ring elements 7, 11 are brought at least substantially to a circular shape by radial props or the like (not shown) and welded together with the prefabricated hollow member 6 and cap 10.

The ring 33 is brought to the erection site either in one piece or in a number of pieces and is clamped together on site to the required peripheral size by means of the elements 50, 56, 58. Thereafter, the ring 33 is placed on a substantially horizontal base and the cover 5 is so placed in the ring 33 that the bottom generatrices of the apertures 30 are disposed only a short distance below the top edge of the ring 33. The balls 31, of which e.g. something like 100 are used, are introduced in this position into the apertures 30 from the outside. The cover 5 is then lowered until coming to rest on the shoulder 43. Meanwhile, the vessel part 4 has been completely erected and the seals 18, 19 positioned.

By means of the lugs or the like 34, the lifting tackle then raises the ring 33 and the cover 5, moves the whole over the vessel part 4 and lowers the whole on to the vessel part 4, the cover 5 first being centered by means of a conical surface 44 of the edge 20 on a slightly conical top end 45 of the edge 12.

Upon continued descent, the cover 5 settles on the seals 18, 19 and deforms them resiliently and possibly plastically. The arm 23 is received either in the direct contact or with a slight clearance inside the edge 12. Upon further lowering of the ring 33, the shoulder 43 disengages from the bottom end face of the arm 22, the balls 31 are first displaced radially inwards by the upper conical side surface of the recess 40 to move from an unlocking position within the apertures 30, and then pressed onto the base of the groove 15 by the conical surface 41 to move into a locking position within the apertures 30 and groove 15. Abutments (not shown) can be provided to prevent any further descent of the ring 33 after the lifting tackle and the hooks 35 have been disengaged from the lugs 34.

To open the vessel, the lifting tackle is connected to the lugs 34 and the ring 33 is raised until the shoulder 43 substantially abuts the bottom edge of the arm 22. The edge 20 can be tapped lightly to overcome the friction of the balls 31 if the same do not roll of their own accord towards the outside in the conical apertures 30 or are not moved out during further raising of the ring 33, the same now moving the cover 5.

If required, one or more of the shims 60 of the ring 33 can be replaced by shims of a different thickness to adjust the corrrect clearance between the surface 41 and the groove 15.

The balls 31 can, of course, be arranged in two or more planes parallel to the interface plane, the apertures 30 being arranged in a row on the periphery, preferably without staggering relative to one another. A groove 15 in the shape of a circle segment in the edge 12 (i.e. an individual spherical recess) and a trapezoidal groove 40 in the ring 33 are, in this case, associated with each aperture plane.

In order to ensure that the hertzian pressure caused by the balls 31 is low at the edge 12, discrete cap-shaped chamfers flush with the apertures 30 can be provided instead of the groove 15. In this case, the position of the cover 5 relatively to the vessel part 4 is, conveniently, located peripherally e.g. by means of at least one wedge which is disposed on the periphery of the edge 12 and which engages in a groove of the arm 22. This feature is not expressly shown.

If the pressures which the closure between the cover 5 and vessel part 4 have to deal with are very large, balls cease to be satisfactory closure members. Instead, it is convenient to use closure or locking members having at least substantially cylindrical bearing surfaces, thus providing larger carrying surfaces. Closure members of this kind are engaged by a tilting or turning movement.

For example, referring to FIG. 5, the locking means may use plate-like closure or locking members 70. Preferably, the members 70 are produced by being parted off from bar stock of appropriate section. Such a section has a cylindrical head 71 with a center of curvature M and a radius r; a hasp or bolt or the like 72 having a cylindrical bearing surface 73 of radius R and a center of curvature Z lying outside the center M as referred to the vessel axis (not shown); and a projection of lever 75 which extends to the outside from the head 71. As shown, the lever 75 has top and bottom cylindrical surfaces 76, 77 at the free end which are contiguous with two plane surfaces 76', 77', respectively, of a rectangular groove 78 in a clamping ring 79.

The outer ring element 80 is formed with slot-like apertures or recesses 81 which receive the closure members 70 and which are produced by a cutting operation followed e.g. by spark erosion. The inner ring element 82 is formed with an annular groove 83 bounded by a conical surface 84 and a toroidal surface 85. The profile of the surface 85 is substantially of a radius R with a center of curvature coincident to the center of curvature Z of the hasp bearing surface 73. The members 70 can be pivoted around the center M by axial displacement of the ring 79, the relative position of the centers M and Z to one another being such that, during pivoting-out, a gap opens between the bearing surface 85 of the groove 83 and the opposite surface 73 of the hasp 72. This gap closes during pivoting-in and thus clamps the ring elements 80, 82 and therefore the cover 5 and vessel section 4, by way of the hasps 72.

As indicated the bearing surface 96 of each recess 81 is matingly shaped to the bearing surface of the head 71 so as to permit pivoting of the member 70.

Of course, the concave and convex elements of the bearing can be arranged the other way round in the mounting of the hasps 72 in the outside ring element 80—i.e., the bottom boundary of the recesses 81 can be the cylindrical head, in which event the concave socket surface is disposed in the hasp 72.

Figure 7:
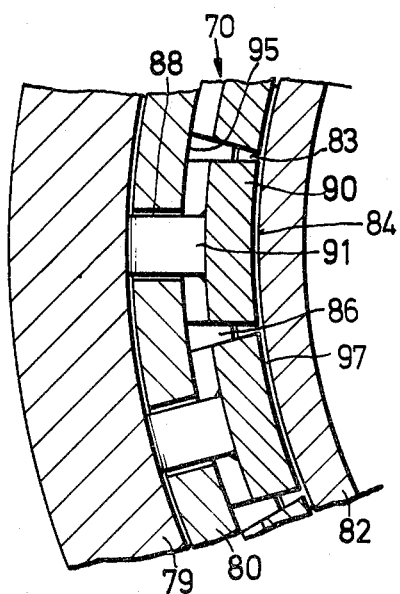
FIG. 7 illustrates a view taken on line VII—VII of FIG. 6.
Figure 6:
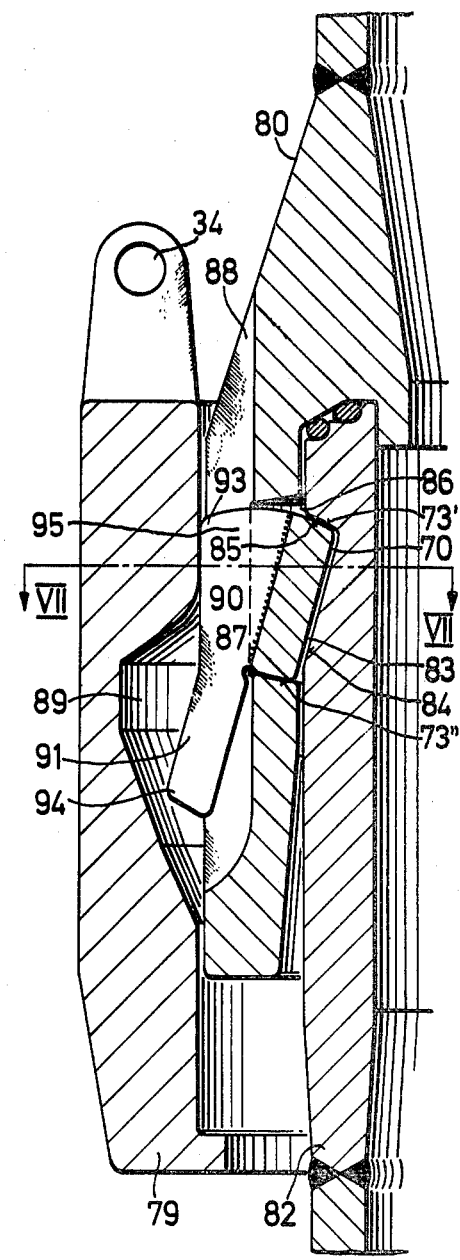
FIG. 6 illustrates a cross-sectional view of a further modified locking means in accordance with the invention.

Referring to FIGS. 6 and 7 in order to deal with even greater forces, the locking means may be constructed in an alternative manner. In this case, the inside ring element 82 is also formed with a substantially triangular annular groove 83 having a conical surface 84 and a toroidal surface 85, in the manner described with reference to FIG. 5. The outside ring element 80 is formed on the inside with an annular recess 86 whose bottom end face 87 is shaped like a socket after the fashion of a toroidal surface. On the outside, the ring element 80 is formed with radial longitudinal slots 88 which cut through the outside radial boundary 95 of the groove 86.

The clamping ring 79 is formed with a substantially trapezoidal annular recess 89 while the closure members 70 are in the form of slightly curved bolts or hasp elements 90 which have a slightly concave surface facing the groove 83 (FIG. 7). Each hasp element 90 has two toroidal surfaces 73', 73'' (one at the top and one at the bottom) which are convex in radial section. A ribbed extension 91 which acts as a lever and which has two projections 93, 94 is welded to each element 90.

With the system in the closed state, the inside concave side surface 97 of each element 90 bears on the conical surface 84 of the groove 83 in the inner ring element 82. With the closure member 70 in this position, the projection 93 of the rib 91 is in engagement with the cylindrical inside wall of the clamping ring 79, while the projection 94 extends freely into the annular recess 89.

When the ring 79 is lifted, the closure members 70 remain in the position shown, relative to the outside and inside ring elements 80, 82, until the projection 93 comes near the recess 89. Thereafter, the projection 94 abuts the bottom conical surface of the recess 89 and the member 70, rotating counter-clockwise in the recess 86, pivots, the hasp element 90 releasing the inside ring element 82.

Very advantageously, the peripheral dimension of the hasp element 90 is substantially the same as the pitch of the slots 88, so that the toroidal surface 85 of the groove 83 in the inside ring element 82 bears to a very substantial extent on the elements 90. To further boost this effect, the bearing surfaces of the elements 90 are also partial toroidal surfaces 73'. The required shaping can readily be produced in manufacture by precision casting of the elements 90.

In this example, the closure members 70 are fitted from the inside, the outside ring element 80 and the clamping ring 79 being disposed approximately in the position shown in FIG. 6 but separated from the inside ring element 82. When the ring 79 rises relative to the outside ring element 80, the closure members 70 first tilt outwardly, as described, the elements 90 pivoting back into the groove 86 in ring element 80; the lifting tackle then places the ring 79 and cover 5 on the ring element 82. Lowering the ring 79 relative to the ring element 80 allows the elements 90—assisted by the guiding of the projections 93 on the top boundary of the recess 89—to pivot inwardly into the groove 83 in the inside ring element 82. In this case, and as in the embodiment previously described, the cover 5 and the vessel part 4 are clamped together by consecutive closure of a gap between the surfaces 73' and 85.

What is claimed is:

1. A pressure vessel comprising
a hollow member having a cylindrical end of predetermined outer diameter;
a cap having a cylindrical end of an outer diameter equal to said predetermined diameter;
a first thin ring element free of radial flanges welded to said end of said hollow member to form a vessel part, said first ring element having an outer diameter adjacent said hollow member equal to said predetermined diameter;
a second thin ring element free of radial flanges welded to said end of said cap to form a cover, said second ring element being disposed in overlapping relation with said first ring element and having an outer diameter adjacent said cap equal to said predetermined diameter; and
means for locking said overlapped ring elements together, said locking means including at least one groove in said first ring element, at least one radially disposed aperture in said second ring element, a locking element disposed in said aperture for movement between an unlocking position within said aperture and a locking position within said aperture and said groove, and an outer clamping ring about said second ring element and said aperture for moving said locking element from said unlocking position to said locking position.

2. A pressure vessel as set forth in claim 1 wherein each ring element is of greater thickness than said hollow member and said cap and wherein said second ring element engages internally around said first ring element.

3. A pressure vessel as set forth in claim 1 wherein said ring elements overlap in a horizontal plane between said vessel part and said cover.

4. A pressure vessel comprising
a hollow member having a cylindrical end of predetermined outer diameter;
a cap having a cylindrical end of an outer diameter equal to said predetermined diameter;
a first thin ring element free of radial flanges welded to said end of said hollow member to form a vessel part;
a second thin ring element free of radial flanges welded to said end of said cap to form a cover, said second ring element being disposed in overlapping relation with said first ring element; and
means for locking said overlaped ring elements together, said locking means including an annular groove in said first ring relement, a plurality of radially disposed apertures in said second ring element, a plurality of balls, each said ball being disposed in a respective aperture for movement between an unlocking position within said respective aperture and a locking position within said respective aperture and said groove, and a clamping ring about said second ring element, said clamping ring having an internal conical surface for moving said balls from said unlocking positions to said locking positions in response to movement of said clamping ring coaxially of said ring elements.

5. A pressure vessel comprising
a hollow member having a cylindrical end of predetermined outer diameter;
a cap having a cylindrical end of an outer diameter equal to said predetermined diameter;
a first thin ring element free of radial flanges welded to said end of said hollow member to form a vessel part;
a second thin ring element free of radial flanges welded to said end of said cap to form a cover, said second ring element being disposed in overlapping relation with said first ring element; and
means for locking said overlapped ring elements together, said locking means including an annular groove in said first ring element; a plurality of radilly disposed apertures in said second ring element; a plurality of plate-like closure members, each said closure member being rotatably disposed in a respective aperture and having a hasp for movement between an unlocking position within said respective aperture and a locking position within said respective aperture and said groove, and a lever extending radially outwardly of said second ring element, said clamping ring having an annular groove receiving each lever of a respective closure member whereby upon movement of said clamping ring coaxially of said second ring element, each hasp of said closure members moves between said unlocking and locking position.

6. A pressure vessel as set forth in claim 5 wherein each aperture in said second ring element has a part-toroidal bearing surface for a respective closure member with a first center of curvature within the plane of said closure member, and each closure member has a first part-toroidal bearing surface engaging said bearing surface of said aperture and a second part-toroidal bearing surface for engaging in said groove of said first ring element with a center of curvature radially outside said first center of curvature whereby a radially outwards pivoting of each closure member opens a gap between said groove and said second bearing surface of said respective closure member.

7. A pressure vessel comprising
a hollow member having a cylindrical end of predetermined outer diameter;
a cap having a cylindrical end of an outer diameter equal to said predetermined diameter;
a first thin ring element free of radial flanges welded to said end of said hollow member to form a vessel part;
a second thin ring element free of radial flanges welded to said end of said cap to form a cover, said second ring element being disposed in overlapping relation with said first ring element; and means for locking said overlapped ring elements together, said locking means including an annular groove in said first ring element, a plurality of balls mounted in said second ring element for movement into and out of said groove and a clamping ring about said second ring element for moving said balls into said groove, said clamping ring having an annular recess to receive said balls with said balls out of said groove and an upwardly directed converging conical clamping surface within said recess for moving said balls into said groove in response to a downwardly directed movement of said clamping ring relative to said ring elements.

8. A pressure vessel comprising a hollow member having a cylindrical end of predetermined outer diameter;

a cap having a cylindrical end of an outer diameter equal to said predetermined diameter;

a first thin ring element free of radial flanges welded to said end of said hollow member to form a vessel part;

a second thin ring element free of radial flanges welded to said end of said cap to form a cover, said second ring element being disposed in overlapping relation with said first ring element; and means for locking said overlapped ring elements together, said locking means including an annular groove in said first ring element, a plurality of locking members mounted in said second ring element for movement into and out of said groove and a clamping ring about said second ring element for moving said locking members into said groove, said clamping ring having a shoulder at a lower end for abutting a bottom edge of said second ring element in a raised position of said clamping ring relative to said second ring element.

9. A pressure vessel as set forth in claim 8 wherein said clamping ring has means for the connection of lifting tackle.

10. A method of producing a large diameter pressure vessel at an erection site, said method comprising the steps of welding a plurality of discrete elements together at the erection site to form a hollow member and a cap each having a cylindrical end;

prefabricating a pair of thin ring elements free of radial flanges in a shop;

resiliently deforming each ring element into an ellipse shape;

shipping the deformed ring elements to the erection site; and thereafter bringing each respective ring element to the original undeformed prefabricated shape, disposing each ring element in facing relation to a cylindrical end of a respective hollow member and cap and welding the respective ring element to the respective end of the hollow member and cap at the erection site.

11. A method as set forth in claim 10 which further comprises the steps of locking the ring elements coaxially together.

12. A pressure vessel comprising a hollow member having a cylindrical end of predetermined outer diameter;

a cap having a cylindrical end of an outer diameter equal to said predetermined diameter;

a first ring element welded to said end of said hollow member to form a vessel part;

a second ring element welded to said end of said cap to form a cover, said second ring element being disposed in overlapping relation with said first ring element; and means for locking said overlapped ring elements together, said locking means including an annular groove in said first ring element; a plurality of plate-like closure members, each said closure member being rotatably disposed in a respective aperture and having a hasp for movement between an unlocking position within said respective aperture and a locking position within said respective aperture and said groove, and a lever extending radially outwardly of said second ring element; and a clamping ring about said second ring element, said clamping ring having an annular groove receiving each lever of a respective closure member whereby upon movement of said clamping ring coaxially of said second ring element, each hasp of said closure members move between said unlocking and locking positions.

13. A pressure vessel comprising a hollow member having a cylindrical end of predetermined outer diameter;

a cap having a cylindrical end of an outer diameter equal to said predetermined diameter;

a first ring element welded to said end of said hollow member to form a vessel part;

a second ring element welded to said end of said cap to form a cover, said second ring element being disposed in overlapping relation with said first ring element; and means for locking said overlapped ring elements together, said locking means including an annular groove in said first ring element, a plurality of balls mounted in said second ring element for movement into and out of said groove and a clamping ring about said second ring element, said clamping ring having an annular recess to receive said balls with said balls out of said groove and an upwardly directed converging conical clamping surface within said recess for moving said balls into said groove in response to a downwardly directed movement of said clamping ring relative to said ring elements.

* * * * *